United States Patent
Taillandier

(10) Patent No.: US 9,208,910 B2
(45) Date of Patent: Dec. 8, 2015

(54) INSTALLATION FOR WELDING NUCLEAR FUEL ASSEMBLY SKELETONS, AND CORRESPONDING METHODS OF PROGRAMMING, OF SKELETON WELDING, AND OF MAKING A FUEL ASSEMBLY

(71) Applicant: SOCIETE FRANCO-BELGE DE FABRICATION DE COMBUSTIBLE, Courbevoie (FR)

(72) Inventor: Thierry Taillandier, St. Paul Les Romas (FR)

(73) Assignee: AREVA NP, Courbevoie (FR)

( * ) Notice: Subject to any disclaimer, the term of this patent is extended or adjusted under 35 U.S.C. 154(b) by 0 days.

(21) Appl. No.: 13/912,838

(22) Filed: Jun. 7, 2013

(65) Prior Publication Data
US 2013/0270241 A1    Oct. 17, 2013

Related U.S. Application Data

(63) Continuation of application No. 11/791,879, filed as application No. PCT/FR2005/002984 on Nov. 30, 2005, now abandoned.

(30) Foreign Application Priority Data

Nov. 30, 2004  (FR) .................................. 04 12707

(51) Int. Cl.
| | |
|---|---|
| *B23K 31/02* | (2006.01) |
| *B23K 11/00* | (2006.01) |
| *B23K 9/00* | (2006.01) |
| *B23K 9/32* | (2006.01) |
| *G21C 21/00* | (2006.01) |
| *G21C 3/334* | (2006.01) |
| *B23K 9/127* | (2006.01) |

(52) U.S. Cl.
CPC .............. *G21C 21/00* (2013.01); *B23K 9/1272* (2013.01); *G21C 3/334* (2013.01); *G21Y 2002/202* (2013.01); *G21Y 2002/203* (2013.01); *G21Y 2002/205* (2013.01); *G21Y 2002/304* (2013.01); *G21Y 2004/30* (2013.01); *G21Y 2004/40* (2013.01); *G21Y 2004/501* (2013.01); *Y02E 30/40* (2013.01); *Y10S 901/42* (2013.01)

(58) Field of Classification Search
CPC ...... G21C 21/00; G21C 3/334; B23K 9/1272; Y10S 901/42
USPC ........ 219/55, 59.1, 60.2, 61.3, 61.4, 67, 86.1, 219/86.25, 86.31, 86.61, 86.7, 90, 91.2, 219/124.22, 125.1
See application file for complete search history.

(56) References Cited

U.S. PATENT DOCUMENTS 4,952,773 A * 8/1990 Orsos et al. .............. 219/124.34

FOREIGN PATENT DOCUMENTS

| JP | 55112182 A | * | 8/1980 |
|---|---|---|---|
| JP | 05050386 A | * | 3/1993 |

OTHER PUBLICATIONS

Machine Translation of FR 2670947, Thiebaut.*
Human Translation of JP05050386A, Mar. 1993, Takizawa.*
Machine Translation of FR 2670947, Dec. 1990, Thiebaut.*

* cited by examiner

*Primary Examiner* — Dana Ross
*Assistant Examiner* — Lindsey C Teaters
(74) *Attorney, Agent, or Firm* — Davidson, Davidson & Kappel, LLC

(57) ABSTRACT

The installation provided includes at least one structure for receiving and holding guide tubes and structural elements; a carriage movable parallel to the guide tubes; at least one welding tool; and displacement means for moving the welding tool, the displacement means connecting the pincer to the carriage and presenting at least six degrees of freedom.

20 Claims, 6 Drawing Sheets

INSTALLATION FOR WELDING NUCLEAR FUEL ASSEMBLY SKELETONS, AND CORRESPONDING METHODS OF PROGRAMMING, OF SKELETON WELDING, AND OF MAKING A FUEL ASSEMBLY

This is a continuation of U.S. application Ser. No. 11/791,879 filed May 30, 2007, which is hereby incorporated by reference herein, and claims priority to French Patent Application FR 04 12707, which is hereby incorporated by reference herein.

The present invention relates to an installation for welding structural elements onto guide tubes of a nuclear fuel assembly skeleton, the installation comprising:

at least one structure for receiving and holding guide tubes and structural elements;

a carriage movable parallel to the guide tubes;

at least one welding tool; and displacement means for moving the welding tool, the displacement means connecting the pincer to the carriage and presenting at least five degrees of freedom.

The invention applies in particular to welding grids for holding nuclear fuel rods.

FR-2 670 947 discloses an installation of the above-specified type that enables grids to be welded that are provided with welding tongues projecting from the top faces of the grids. The displacement means of the welding installation comprise a support box that is movable transversely relative to the guide tubes, a vertically-extensible arm, and a steerable wrist that carries a welding pincer. The steerable wrist is capable of moving in rotation about three distinct axes, such that the welding pincer presents a total of six degrees of freedom. The above-described installation makes it possible to achieve high rates of welding throughput, but it is still desirable to increase those rates.

U.S. Pat. No. 4,587,394 also discloses a welding installation, which installation has four welding tools moving simultaneously so that each contributes to welding grids to the guide tubes of a given skeleton. Each tool is connected to a carriage that is movable longitudinally relative to the guide tubes by displacement means that present three degrees of freedom. Although the four welding tools move simultaneously, the rates of throughput achieved by such a welding installation are likewise found to be too slow.

SUMMARY OF THE INVENTION

An object of the invention is to solve that problem by providing an installation of the above-specified type that makes it possible to achieve faster rates of welding.

To this end, the invention provides an installation for welding structural elements onto guide tubes of a nuclear fuel assembly skeleton, the installation comprising:

at least one structure for receiving and holding guide tubes and structural elements;

a carriage movable parallel to the guide tubes;

at least one welding tool; and displacement means for moving the welding tool, the displacement means connecting the welding tool to the carriage and presenting at least five degrees of freedom;

the installation being characterized in that the displacement means present at least six degrees of freedom.

The invention also provides a programming method.

The invention also provides a method of welding a nuclear fuel assembly skeleton.

The invention also provides a method of making a nuclear fuel assembly.

BRIEF DESCRIPTION OF THE DRAWINGS

The invention can be better understood on reading the following description given purely by way of example and made with reference to the accompanying drawings, in which.

DETAILED DESCRIPTION

Figure 1:
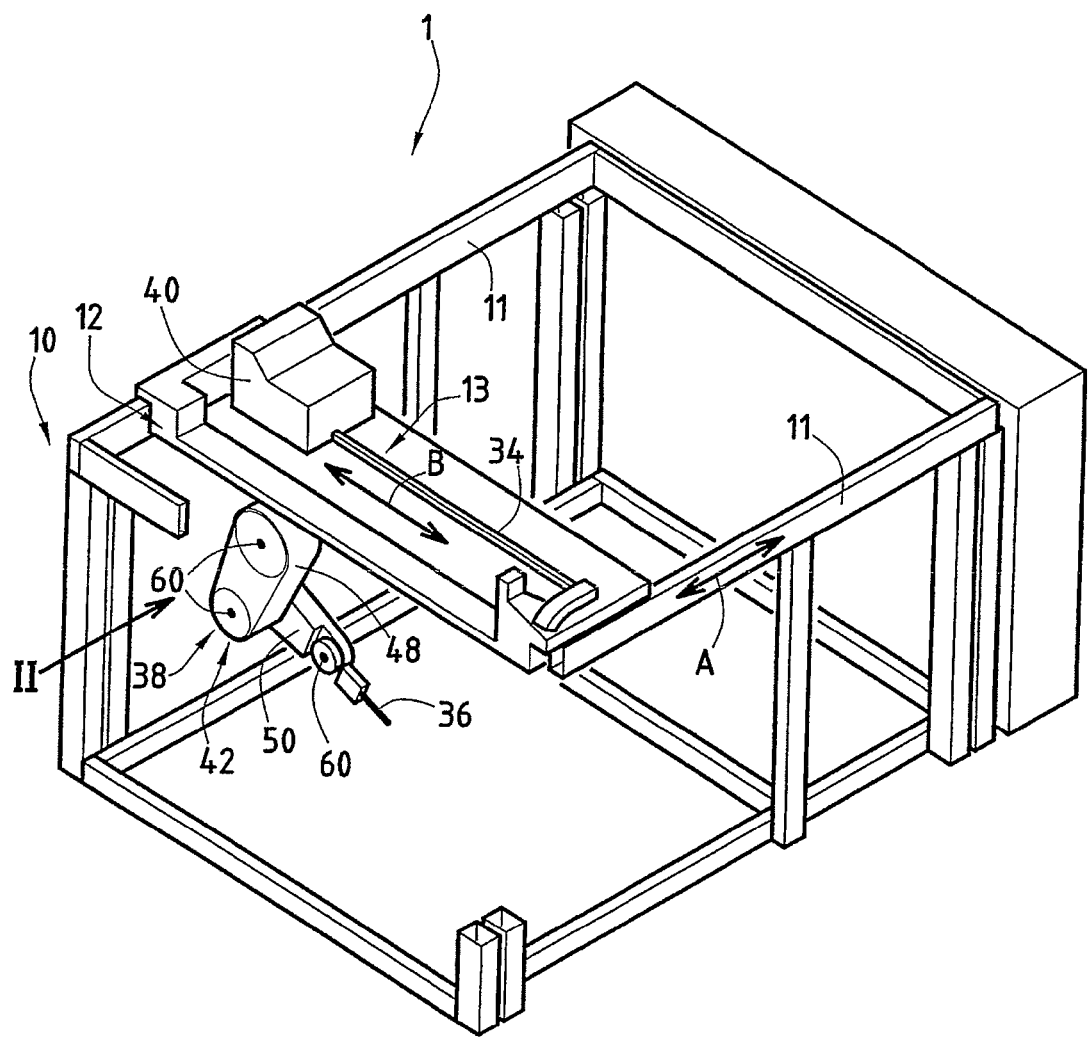
FIG. 1 is a diagrammatic perspective view showing a welding installation of the invention, the structure for receiving the skeletons not being shown.
Figure 2:
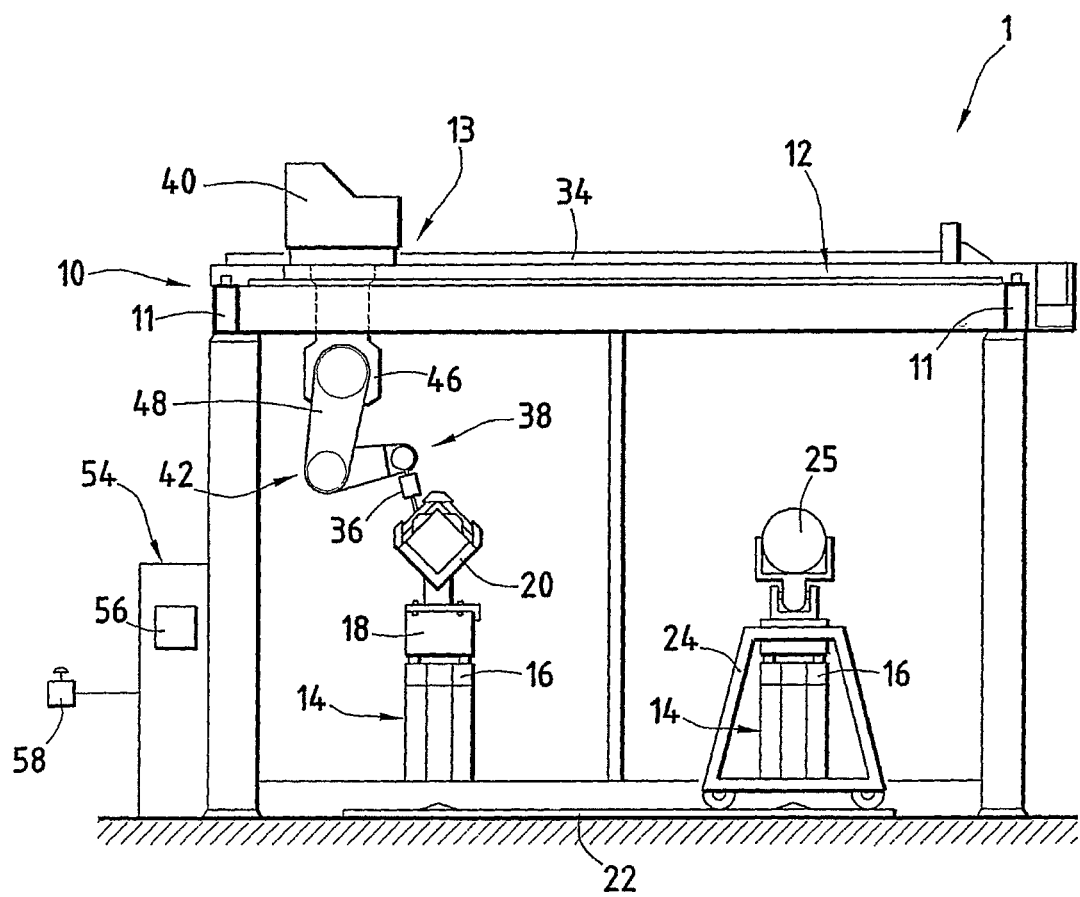
FIG. 2 is a diagrammatic face view of the FIG. 1 installation, seen looking along the direction of arrow II in FIG. 1.

FIGS. 1 and 2 are diagrams showing an installation 1 for welding structural elements onto guide tubes of nuclear fuel assembly skeletons.

More precisely, the structural elements considered below are grids for holding nuclear fuel rods, even though other structural elements, such as sleeves, could also be welded by the installation 1.

Figure 3:
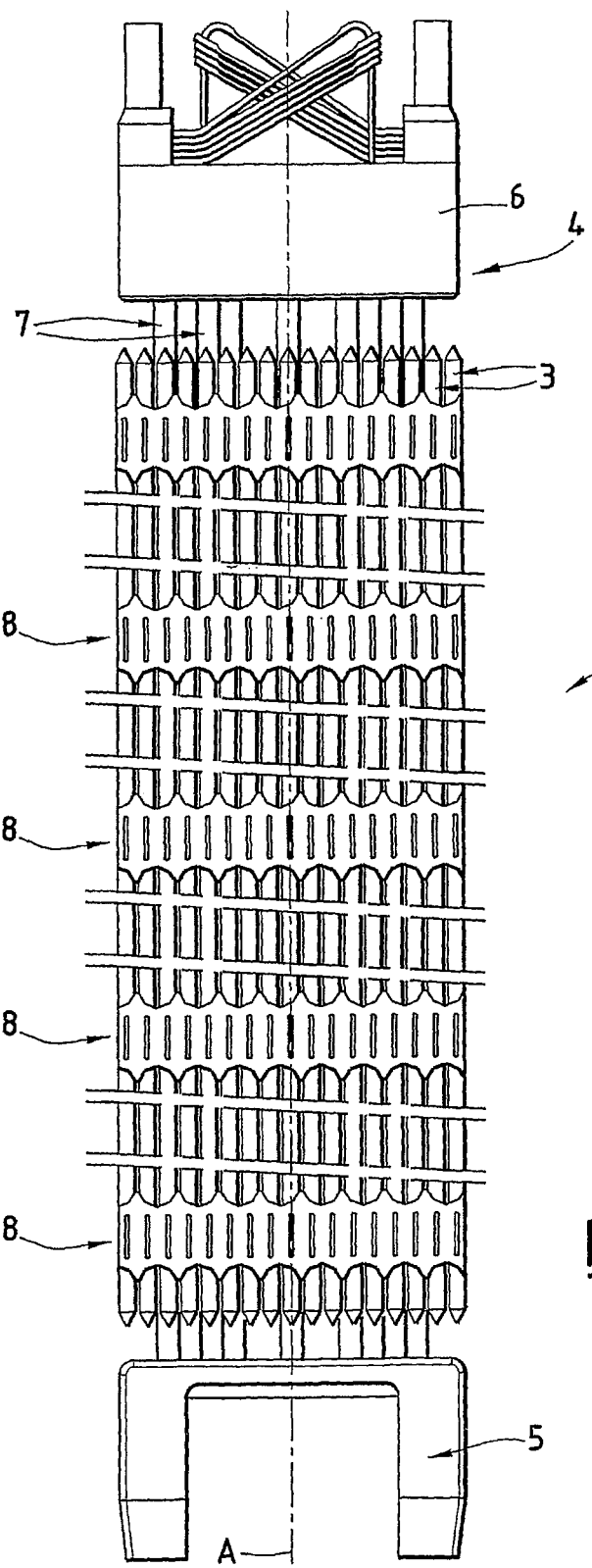
FIG. 3 is a fragmentary diagrammatic view in perspective showing a portion of the skeleton of a nuclear fuel assembly that can be welded by the installation of FIG. 1.

With reference to FIG. 3, it is recalled that a fuel assembly 2 mainly comprises nuclear fuel rods 3 and a structure or skeleton 4 for supporting the rods 3.

Conventionally, the support skeleton comprises:

a bottom nozzle 5 and a top nozzle 6 disposed at the longitudinal ends of the assembly 1;

guide tubes 7 for receiving the rods of a cluster (not shown) for controlling and stopping the nuclear reactor; and grids 8 for holding the rods 3.

The nozzles 5 and 6 are secured to the longitudinal ends of the guide tubes 7.

The rods 3 extend vertically between the nozzles 5 and 6. The rods 3 are disposed at the nodes of a substantially regular square-based array in which they are held by the grids 8. Some of the nodes of the array are occupied by the guide tubes 7, and possibly by a central tube for instrumentation purposes.

Conventionally, the grids 8 comprise sets of crossed plates that define between them cells that are centered on the nodes of the regular array. Most of the cells are for receiving a respective fuel rod 3. Each of the other cells receive a guide tube 7, and the central cell optionally receives an instrumentation tube 14.

Usually, the grids 8 are provided with welding tabs that project upwards and that enable the grids 8 to be welded to the guide tubes 7. There are also exist grids that do not have such tabs, as shown in U.S. Pat. No. 4,849,161. The double plates of the grid in that document then present top setbacks defining zones for welding the grid to the guide tubes 7.

Like the installation of document FR-2 670 947, the installation 1 of FIGS. 1 and 2 comprises an assembly bench 10 suitable for being covered laterally by protective panels. The bench 10 is constituted by a metal gantry comprising uprights and two horizontal longitudinal rails 11 on which there travels a carriage 12 carrying a welding robot 13.

The bench 10 defines two parallel work zones (FIG. 2), each at least as long as a skeleton 4 for welding, and disposed side by side. In each of the zones there is placed a structure 14 enabling a skeleton 4 to be preassembled thereon. Each structure 14 extends parallel to the rails 11 and may comprise a machine-welded table 16 with a surface slab 18.

As shown in FIG. 2, the bench 10 also has rails 22 disposed transversely to the rails 11 and enabling a cage 24 to move between the position in which it is shown in FIG. 2, where it is facing one of the structures 14, and another position where it is facing the other structure 14. The cage 24 is provided with longitudinal rails on which there travels a carriage 25 for positioning expandable mandrels that are to be inserted in the guide tubes 7 at the welding locations in order to prevent the tubes becoming deformed. These mandrels may have the structure as already described in document FR-A-2 533 353 and they may be guided by frames carried by the cage (not shown).

The surface slab 18, which extends over the entire length of the structure 14, is designed to receive, at adjustable locations, frames 20 for positioning and holding the grids 8 of the skeleton that is to be welded. These frames 20, are provided with means enabling them to be opened in order to insert a grid 8 and enabling them to be reclosed, and they may be of conventional structure. In the example shown, the frames 20 for receiving the grids 8 of a skeleton 4 have their diagonals extending horizontally and vertically.

The carriage 12 occupies the entire width of the assembly bench and carries at least one transverse rail 34.

The welding robot 13 has a resistance welding pincer 36 and displacement means 38 for moving the welding pincer 36 that connect the pincer 36 to the carriage 12.

The displacement means 38 comprise:

a support box 40 that is movable transversely on the rail(s) 34;

an articulated arm 42 extending the support box 40 downwards; and a steerable wrist 44 extending the arm 42 and carrying the welding pincer 36.

The support box 40 may contain the welding transformer for feeding electricity to the welding pincer 36.

By means of the carriage 12, it is possible to move the welding pincer 36 relative to the bench 10 in translation in the X direction as represented by double-headed arrow A in FIG. 1, i.e. parallel to the guide tubes 7 of a skeleton placed on a structure 14. Because of the support box 40, it is also possible to move the pincer 36 in translation along the Y direction, i.e. transversely relative to the guide tubes 7, as represented by double-headed arrow B in FIG. 1.

Figure 4:
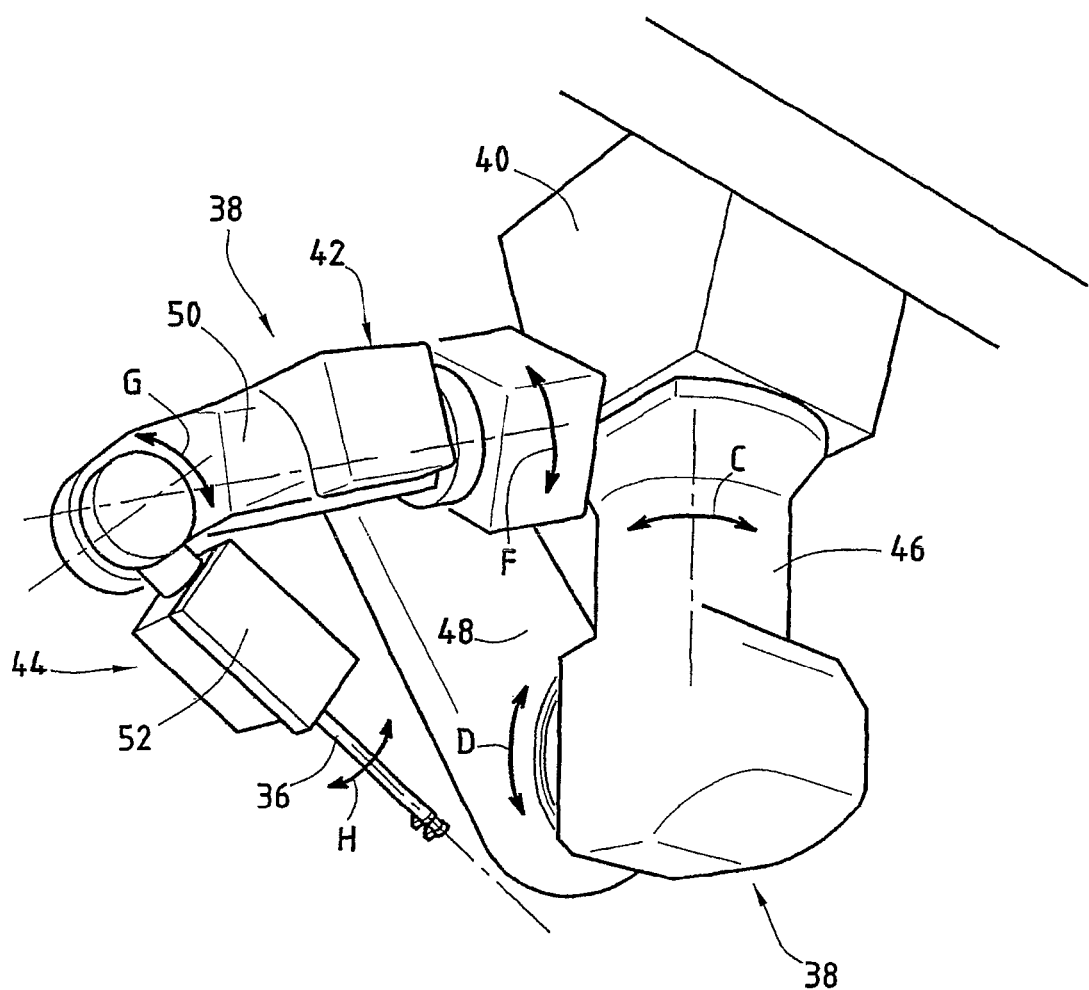
FIGS. 4 and 5 are fragmentary diagrammatic views in perspective showing the means for moving the welding tool in the installation of FIGS. 1 and 2.
Figure 5:
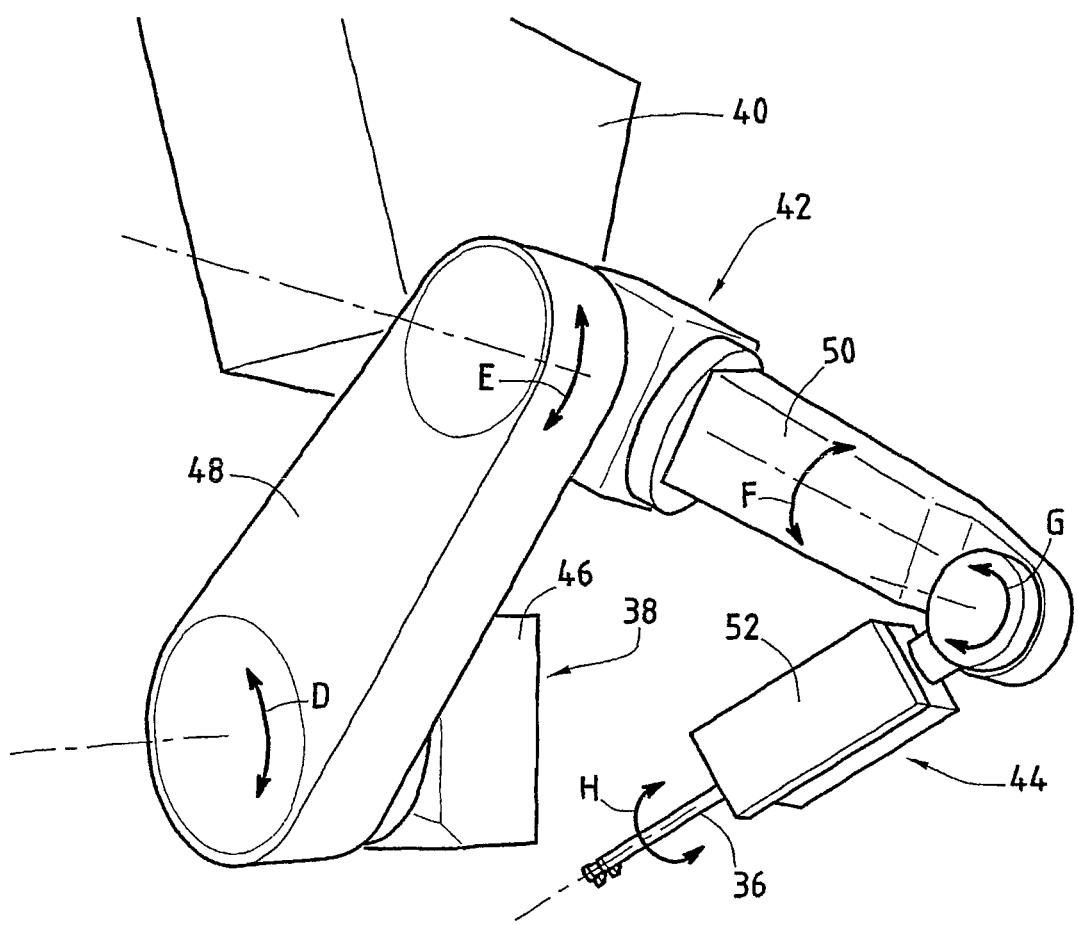

As shown in FIGS. 4 and 5, the arm 42 comprises three successive segments 46, 48, and 50. The first segment 46 extends the support box 40 downwards. The second segment 48 is articulated to the first segment 46 via a double rotary connection enabling both rotary movement about a vertical axis, as represented by double-headed arrow C in FIG. 4, and rotary movement about a horizontal axis, as represented by double-headed arrow D in FIGS. 4 and 5.

The third segment 50 is articulated to the second segment 48 of the arm 42 by a double rotary connection enabling both relative rotary movement about a horizontal axis as represented by double-headed arrow E in FIG. 5, and relative rotary movement about the longitudinal axis of the third segment 50, as represented by double-headed arrow F in FIGS. 4 and 5.

The wrist 44 carries the case 52 of the welding pincer 36. The case 52 is provided with the usual electrical and pneumatic power supply means, constituted by cables. The wrist 44 is connected to the third segment 50 of the arm 42 via a double rotary connection enabling both relative rotary movement about an axis that is orthogonal to the longitudinal axis of the third segment 50, as represented by double-headed arrow G in FIGS. 4 and 5, and rotary movement about the longitudinal axis of the pincer 36, as represented by double-headed arrow H in FIGS. 4 and 5.

Thus, the welding pincer 36 presents eight degrees of freedom represented by arrows A to H, with the displacement means 38 providing seven of them.

As shown in FIG. 2, the installation 1 further includes programmable means 54 for controlling the displacement and the operation of the pincer 36. By way of example, these control means 54 comprise a computer having one or more processors, data storage means 56, input and output means, and display means (not shown).

The input/output means comprise, for example, a user interface, e.g. in the form of a controller 58 enabling the welding pincer 36 to be moved and operated under manual control.

In order to program the control means 54, which means are intended subsequently to control the operation of the welding pincer 36 automatically, it is possible to proceed as follows, by way of example.

An operator uses the controller 58 to control the displacement of the pincer 36 manually until it reaches a first location for welding a first grid 8 to one of the guide tubes 7 of a skeleton 4 that has been preassembled on one of the structures 14, and then the operator causes a welding operation to be performed at this location. The electrodes of the pincer 36 then press the corresponding zone 9 of the grid 8 against the guide tubes 7 in question, thus performing welding by resistance. The coordinates of this first welding location, e.g. delivered by position sensors 60 present in the displacement means 38 are then recorded in the storage means 56. Conventional sensors are shown very diagrammatically in FIG. 1.

Thereafter, the operator continues with the welding sequence for all of the first grid 8 in question, the storage means 56 progressively recording the coordinates of the various locations where welding is performed, and also the positions of the pincer 36 during those welding operations. This sequence for welding a grid 8 is merely a portion of the complete sequence for welding the skeleton 4, and it is therefore referred to below as a "sub-sequence".

Thereafter, the operator brings the pincer 36 to the first location for welding a second grid 8 to the guide tubes 7 of the skeleton 4. The operator can then trigger execution of the welding sub-sequence as previously carried out manually on the first grid 8 and recorded.

By proceeding in this way for each of the grids 8, the storage means 56 record the data needed for performing all of the welding operations that need to be performed on all of the grids present along the guide tubes 7.

This complete sequence for welding the grids 8 of a skeleton 4 is then stored and can be executed automatically when a skeleton 4 of the same type is to be welded by the installation, with the operator then needing only to position the pincer 36 on the first location for welding the first grid 8 and then triggering execution of the entire sequence.

It is also possible to store, e.g. in the same manner as described above, complete sequences in the storage means 56 for welding skeletons of other types.

This programming method, based on recording a training sequence carried out under manual control, is very user-friendly and can be implemented very quickly. In particular, it is less time-consuming than prior art methods that require all of the coordinates of all of the welding positions to be defined one by one. Nevertheless, programming in ways other than that described above can also be used with the installation 1. Conversely, this programming technique by training can be used with an installation 1 in which the number of degrees of freedom for the pincer 36 is arbitrary, e.g. six as in FR-2 670 977.

It should also be observed that the complete programmed welding sequences may include sub-sequences that are different for some of the grids 8, and also a sub-sequence for welding guide tubes to one of the nozzles 5 or 6 or to connection elements belonging to one of the nozzles 5 or 6.

Because of the numerous degrees of freedom presented by the pincer 36, it has been found that welding sequences can be performed much more quickly than in the prior art. Surprisingly, it is better to increase the number of degrees of freedom than to increase the number of welding tools.

This is because shorter paths can be followed between the various welding locations.

In addition, because of the extra degrees of freedom in rotation, and in particular because of the possibility of rotating about a horizontal axis as represented by double-headed arrow D, the pincer 36 can move at speeds that are very high, and in particular greater than 13 meters per second (m/s).

In addition, because of the large number of degrees of freedom, the pincer 36 can reach zones that are difficult of access, and in particular zones for welding grids of the kind disclosed in U.S. Pat. No. 4,849,161. The installation 1 can therefore be used for welding grids 8 of all types, and in particular grids that do not present any welding tabs.

Furthermore, the pincer is capable of applying high welding forces, e.g. of the order of 60 decanewtons (daN), even in locations that are difficult of access.

As in FR-2 670 947, the presence of two structures 14 makes it possible to use one for preassembling a skeleton while the other one is being used with the pincer 36 to weld together the elements of a skeleton 4 that has already been preassembled. By operating in parallel in this way, the welding robot 13 is used on an almost continuous basis.

Nevertheless, in certain variants, the installation 1 could have only one structure 14.

In general, the displacement means 48 can present fewer degrees of freedom, for example only seven.

Similarly, the degrees of freedom are not necessarily those described above. It is possible to envisage using combinations of movements in rotation and in translation other than those described above.

Figure 6:
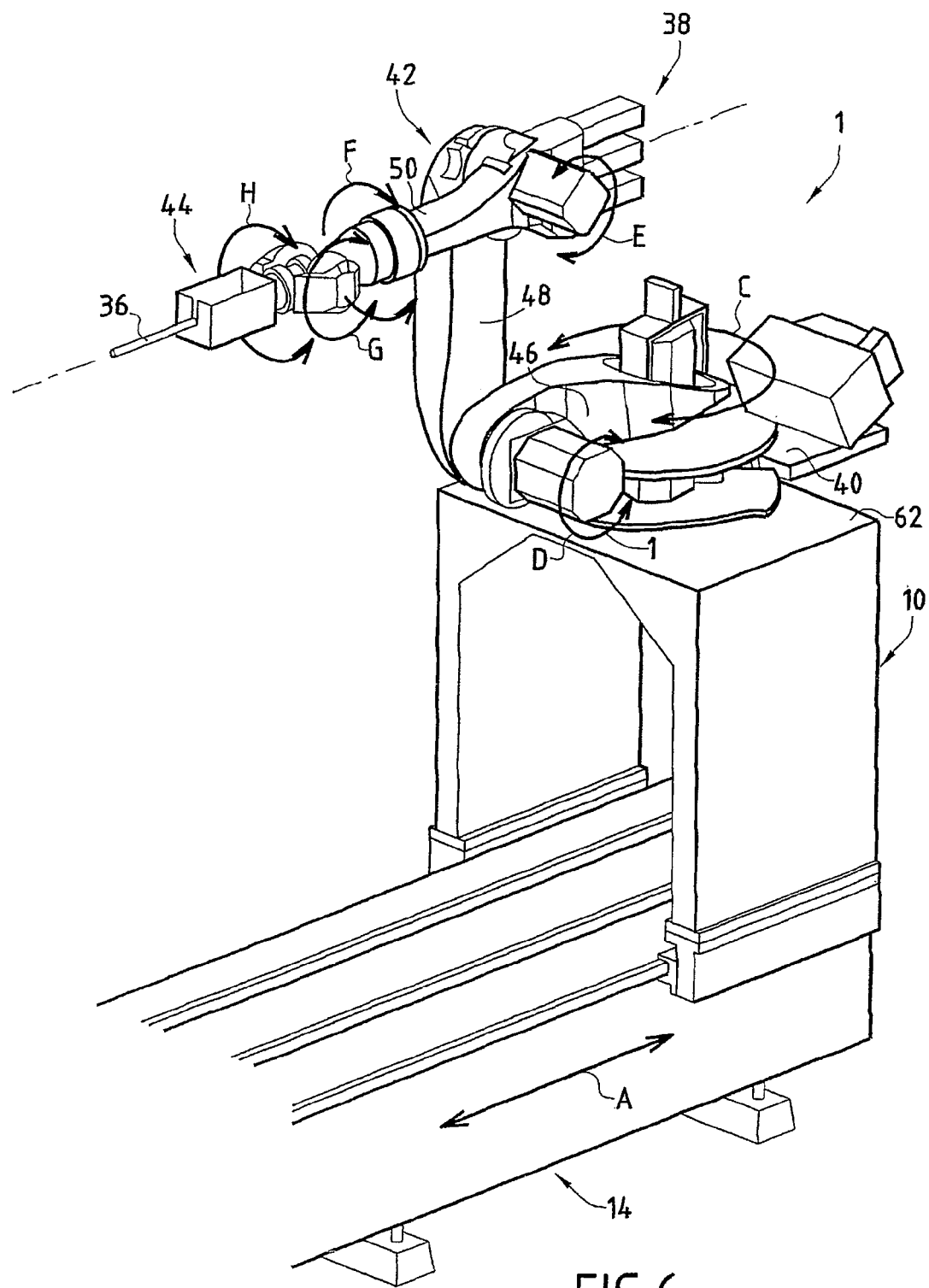
FIG. 6 is a fragmentary diagrammatic view in perspective showing a welding installation in another embodiment.

FIG. 6 shows another embodiment of a welding installation 1 that differs from that described above mainly as follows.

The gantry 10 is mounted to slide on the structure 14 that receives a skeleton for welding. The support box 40 is secured to the top web 62 of the gantry 10 and therefore does not present any degree of freedom relative thereto. The double-headed arrow B of the above-described embodiment is therefore not shown in FIG. 6.

The connection between the segments 48 and 50 of the arm 42 is a simple rotary connection, represented by double-headed arrow E. The connection between the segment 50 and the wrist 44 is a triple rotary connection, represented by double-headed arrows F to H.

The displacement means 38 for moving the tool 36 thus present six degrees of freedom represented by the arrows C to H.

Mounting the gantry 10 on the structure 14 thus enables one degree of freedom to be eliminated, specifically the degree of freedom represented by the arrow B in the above figures.

In addition, mounting the gantry 10 on the structure 14 improves the positioning of the tool 36 relative to a skeleton for welding.

It should be observed that this characteristic can be used independently of the number of degrees of freedom of the displacement means 38.

Thus, a welding installation 1 may have a gantry 10 slidably mounted on a structure 14, without its displacement means 38 presenting at least six degrees of freedom.

In general, the welding tool 36 can implement welding of some type other than resistance welding.

What is claimed is:

1. An installation for welding structural elements onto guide tubes of a nuclear fuel assembly skeleton, the installation comprising:
    at least one structure for receiving and holding guide tubes and structural elements;
    a carriage movable parallel to the guide tubes;
    at least one welding tool; and
    a connector connecting the welding tool to the carriage and including six degrees of freedom formed by a plurality of rotary connections defining six respective rotary movements such that the welding tool presents at least seven degrees of freedom relative to the structure, the welding tool being movable by the connector relative to the carriage, at least one of the rotary connections being a double rotary connection, the double rotary connection being a connection which allows rotation about two distinct axes.

2. The installation according to claim 1, wherein the connector comprises an arm and a wrist connected together by a first double rotary connection.

3. The installation according to claim 2, wherein the arm comprises a first arm segment, a second arm segment and a third arm segment, the third arm segment being connected to the wrist by the first double rotary connection.

4. The installation according to claim 3, wherein the first double rotary connection enables both relative rotary movement about an axis that is orthogonal to a longitudinal axis of the third segment and relative rotary movement about a longitudinal axis of the welding tool.

5. The installation according to claim 3, wherein the welding tool includes a pincer, the wrist carrying the pincer.

6. The installation according to claim 5 wherein the wrist carries a case of the welding pincer, the case being provided with electrical and pneumatic power supply means.

7. The installation according to claim 3, wherein the third arm segment is connected to the second arm segment by a second double rotary connection.

8. The installation according to claim 7, wherein the second double rotary connection enables both relative rotary movement about a horizontal axis and relative rotary movement about a longitudinal axis of the third segment.

9. The installation according to claim 3, wherein the connector comprises a support box movable transversely to the guide tubes.

10. The installation according to claim 9, wherein the first arm segment is connected to the support box.

11. The installation according to claim 1, wherein the carriage is mounted to move on the structure.

12. The installation according to claim 1, wherein the welding tool is a resistance-welding pincer.

13. The installation according to claim 1, further comprising a programmable controller controlling the connector for moving the welding tool, and a manual controller controlling the connector for moving the welding tool.

14. The installation according to claim 13, wherein the connector includes position sensors.

15. A method of programming the installation according to claim 13, the method comprising the steps of:
   manually controlling the connector so that the welding tool executes a welding sequence;
   delivering coordinates for the welding sequence by position sensors; and
   recording the welding sequence in the programmable control means.

16. A method of welding a nuclear fuel assembly skeleton, the skeleton comprising guide tubes and structural elements welded to the guide tubes, the method comprising the step of welding structural elements to the guide tubes using the installation according to claim 1.

17. A method of making a nuclear fuel assembly, the assembly comprising nuclear fuel rods and a skeleton for supporting the rods, the skeleton comprising guide tubes and structural elements welded to the guide tubes, the method using the skeleton welding method according to claim 16.

18. An installation for welding structural elements onto guide tubes of a nuclear fuel assembly skeleton, the installation comprising:
   at least one structure for receiving and holding guide tubes and structural elements;
   a carriage movable parallel to the guide tubes;
   at least one welding tool; and
   a connector connecting the welding tool to the carriage and including a first rotary connection, a second rotary connection and a third rotary connection defining six rotary movements such that the welding tool presents at least seven degrees of freedom relative to the structure, at least one of the first rotary connection, the second rotary connection and the third rotary connection being a double rotary connection, the double rotary connection being a connection which allows rotation about two distinct axes.

19. The installation according to claim 18, wherein the connector comprises an arm and a wrist, the arm comprising a first arm segment, a second arm segment and a third arm segment, the third arm segment being connected to the wrist by a first double rotary connection.

20. The installation according to claim 19, wherein the third arm segment is connected to the second arm segment by a second double rotary connection.

\* \* \* \* \*